Figure 1:
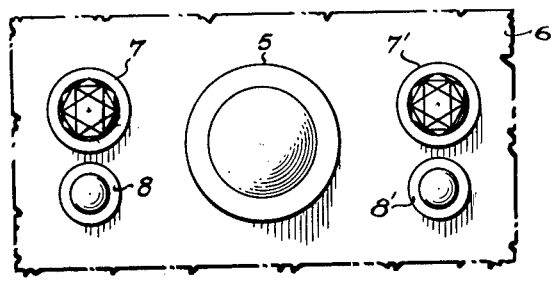

May 12, 1953

R. E. LOVEJOY ET AL 2,638,580

MEANS FOR INDICATING MAXIMUM AND
MINIMUM LIGHTING CONDITIONS

Filed Feb. 27, 1952

INVENTORS
REX E. LOVEJOY
KENNETH A. SMITH
FRANK A. HARRINGTON
BY JERRY K. HARTER

Lynn Latta
—ATTORNEY—

Patented May 12, 1953

2,638,580

UNITED STATES PATENT OFFICE 2,638,580

MEANS FOR INDICATING MAXIMUM AND MINIMUM LIGHTING CONDITIONS

Rex E. Lovejoy, Los Angeles, Kenneth A. Smith, Burbank, Frank A. Harrington, Brea, and Jerry K. Harter, Los Angeles, Calif., assignors to Marco Industries Company, Beverly Hills, Calif., a corporation of California Application February 27, 1952, Serial No. 273,716

7 Claims. (Cl. 340—228)

This invention relates to indicators and relates particularly to the problem of adjusting an indicator for most efficient operation with reference to the level of ambient light (i. e., daylight vs. night conditions). The invention is particularly useful in visible indicator lights which must be clearly noticeable to an operator under both maximum and minimum conditions of ambient light, and which require adjustment from maximum light emission status (for daylight conditions where the indicator light must operate at maximum intensity so as to be readily noticeable) to minimum light emission status (for night conditions where maximum emission would tend to blind the operator). Merely by way of example, indicator lights for night fighter military aircraft, subject to being used both at night time and in daytime, are customarily provided with adjustable shutters whereby, for night purposes, the light emission opening may be stopped down to reduce light emission to a minimum whereas for daylight conditions, the shutter is opened wide so as to provide maximum light emission. Such shutters are manually adjustable, and therefore require the attention of the pilot. So long as the pilot remembers to adjust the shutter to the minimum aperture position when he starts out on a night mission, the indicator light will operate satisfactorily. However, if, through failure to have its shutter properly adjusted, an indicator light, at night, suddenly is illuminated with a wide open shutter, or, when stopped down to minimum aperture, comes on in full daylight, the difficulties noted above will be encountered.

These conditions have brought about a need for a mechanical aid to the operator in maintaining the indicator light shutter always properly adjusted. Accordingly, the general object of the present invention is to provide a system of warning signals for automatically reminding the operator to adjust the indicator light or lights, if not already properly adjusted, for the existing lighting condition. Broadly, the invention contemplates the association with the indicator light of a pair of warning lights of the flasher type, automatically actuated to provide an intermittent flashing together with manual means whereby the pilot may arrest the flashing after he has adjusted the shutter.

Other objects will become apparent in the ensuing specifications and appended drawings in which.

Figure 2:
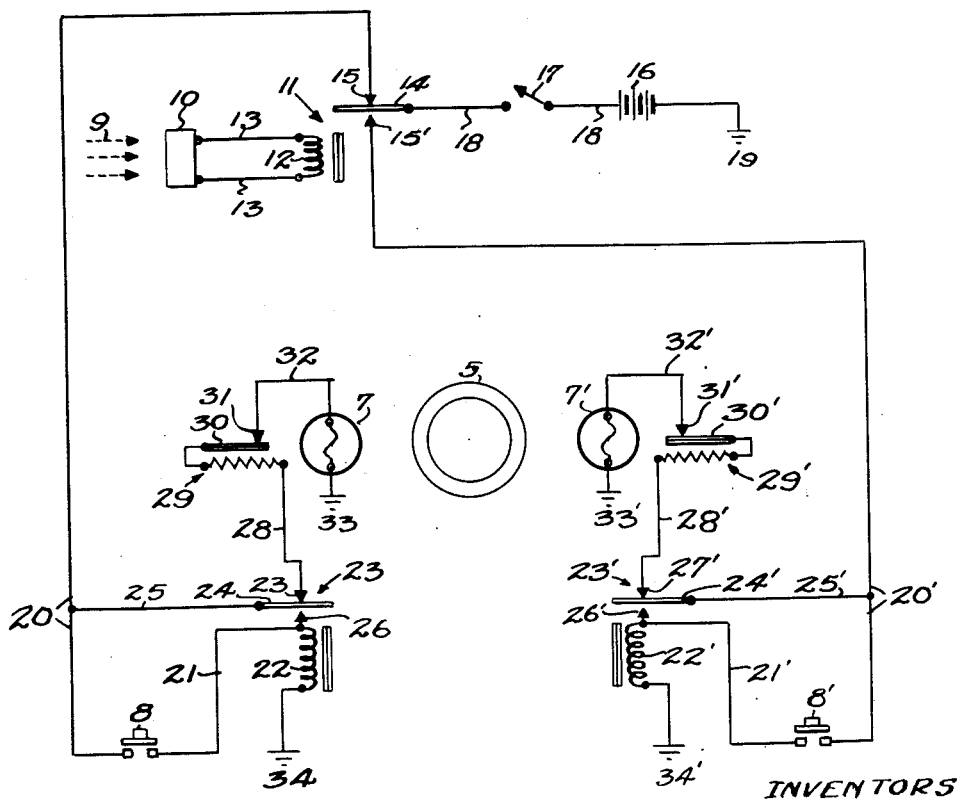

Fig. 1 is a front view of a portion of an instrument panel with a unit of our improved blinker system, associated with an indicator light, mounted therein; and Fig. 2 is a schematic diagram of the blinker system.

Referring now to the drawings in detail, a conventional indicator lamp 5, incorporating a shutter for varying the degree of light emission therefrom, and manually adjustable to vary the shutter aperture, is disclosed as being mounted in a panel 6 such as the instrument panel of a night fighter aircraft. Since the shutter and its adjusting mechanism form no part of the present invention, the details thereof have not been disclosed. Merely by way of example of an indicator light embodying a shutter of the general type contemplated herein, reference may be made to the patent of V. A. Marco No. 2,424,573. In such an indicator light, the shutter may be adjusted readily and simply by rotating the lens cap in one direction or the other.

The blinker light system of our invention utilizes a pair of electrically operated warning signal devices which may be of any known type, either visual or sounding (e. g., electric light, buzzer, horn, chime, etc.), but which, in the preferred form of the invention herein illustrated, comprise blinker lights 7, 7', for example, small jewel lamps. Light 7 may be arranged to flash intermittently when the ambient light is at a minimum (e. g. at night) and may, for example, remind the pilot to stop down the shutter aperture to minimum position by rotation of the lens cap of indicator light 5 in one direction. Blinker light 7' will be arranged to flash intermittently when the ambient light is at a maximum (or at normal daylight level) and will remind the operator to adjust the shutter aperture to wide open position by rotating the lens cap in the other direction. In either case, after the pilot has properly adjusted the shutter aperture, he may arrest the blinking by manually pressing an associated push button 8 or 8' as the case may be. The pilot will of course be trained to make the shutter adjustment before he presses the push button to stop the blinking of the warning signal.

Referring now to Fig. 2, the invention provides mechanism for automatically actuating the blinker lights 7, 7' in response to changes in the intensity of ambient light rays which are indicated by the arrows 9. A two-way operation is attained by utilizing, as the light sensitive instrument, a barrier-layer, self generating photocell 10 such as is commonly employed in light meters used in photography. Such a cell, energized by light rays of sufficient intensity, is adapted to generate an electric current sufficient to actuate a sensitive direct current relay. Such a relay, indicated generally at 11, is a single-pole, double-throw relay and has its actuating coil 12 connected by conductors 13 to the respective terminals of photocell 10. The armature 14 of relay 11 is spring loaded to normally engage a contact 15, and will remain in engagement with that contact so long as light intensity is below a predetermined minimum level determining what may be regarded as night conditions. When the intensity increases above that level, relay 11 will be actuated to shift armature 14 into engagement with an alternate contact 15'. From contacts 15, 15', electric energy from a source 16 is distributed to the respective blinker circuits, presently to be described, whenever a master switch 17, in a conductor 18 leading from source 16 to armature 14, is closed. 19 indicates the grounding of the other side of source 16.

From contacts 15, 15' respectively, power lead conductors 20, 20' one side each of respective push buttons 8, 8'. From the other sides of these push buttons, conductors 21, 21' lead to energizing coils 22, 22' of respective relays 23, 23'. Relays 23, 23' respectively include armatures 24, 24' connected by branch conductors 25, 25' to main power conductors 20, 20'. Armatures 24, 24' are adapted to be drawn into engagement with the respective contacts 26, 26' when respective coils 22, 22' are energized. Upon engagement with a respective contact 26, 26', an armature 24, 24' must set up a holding circuit through branch conductor 25, 25' through a respective coil 22, or 22' to maintain the energization of the respective relays 23, or 23' as the case may be. Coil 22, 22' are grounded as indicated at 34, 34' respectively, to complete their respective circuits.

Armatures 24, 24' are spring loaded for normal engagement with contacts 27, 27', and will thus remain in engagement with those contacts so long as coils 22, 22' are not energized. Relays 23, 23' are of a single pole, double throw type and are normally open or self opening in the sense that their armatures 24' move away from holding circuit contacts 26' when flow of current through their coils 22' is interrupted. From contacts 27, 27', conductors 28, 28' lead to respective blinker control switches 29, 29', which embody respective bi-metallic switch arms 30, 30'. When cold, bi-metallic arms 30, 30' engage contacts 31, 31' respectively, to establish respective circuits through conductors 32, 32' to blinker lights 7, 7', these circuits being completed by ground connections 33, 33' respectively. When passing current, arms 30, 30' become heated and flex momentarily away from contacts 31, 31', to produce an alternating make and break operation which effects the "blinking" of lights 7, 7'.

*Operation*

It will now be apparent that blinker lamps 7, 7' are arranged to be normally operative until rendered inoperative by manual pressure against the respective push button 8, 8', so long as current is being brought to the respective relays 23 or 23' through relay 11. However, when a pushbutton 8 or 8' is pressed, the respective relay 23, 23' will be actuated to its inoperative position in which armature 24 or 24' engages contact 26 or 26', and the holding circuit then set up in the respective coil 22 or 22' will maintain the respective relay 23 or 23' in the inoperative position until the holding circuit is broken.

Under night conditions, light rays 9 will be of such low intensity that relay 11 will be deenergized, with its armature 14 therefore resting against contact 15 as shown in Fig. 2. Thus power from source 16 will be brought through power lead 20 up to relay 23. Assuming that the latter has not been deenergized by closing of a circuit through pushbutton 8, its armature 24 will rest against contact 27 to establish a circuit through conductor 28 and blinker switch 29 to blinker light 7, causing the latter to flash intermittently and thereby remind the pilot of the necessity to check the adjustment of the shutter of indicator light 5 and, if it has not already been properly adjusted, to adjust it to the minimum position. Having done so, the pilot then presses button 8, energizing relay 23 and causing its armature 24 to shift to its position against contact 26, thereby breaking the circuit to blinker light 7 and establishing the holding circuit through coil 22 to ground 34. The pilot may then release button 8, leaving relay 23 energized, so that blinker light 7 will not resume its flashing when button 8 is released, even though relay 11 remains in the position in which current is brought up to armature 24. Even though the pilot thereafter pushes button 8, no change in the system will occur. Likewise, any accidental pushing of button 8 will have no effect on the system, since power lead 20' is disconnected from armature 14.

If the light intensity thereafter rises until it passes above the minimum level which determines the beginning of daylight conditions, the current flowing in the circuit of photocell 10 and relay 11 will increase to the point where armature 14 will be drawn against contact 15', breaking the circuit to relay 23 and causing the armature 24 thereof to shift back to its position in engagement with contact 27, thereby resetting the nighttime blinker system for resumed operation whenever lighting conditions again revert to the night time status.

When armature 14 of relay 11 engages contact 15', power line 20' will be energized to bring current to relay 23', establishing a circuit through conductor 28' and blinker switch 30' to blinker light 7' and causing the latter to flash until it is shut off by the manual act of the pilot in pushing button 8'. In the meantime, the pilot will have been reminded to first adjust the shutter of indicator light 5 to the wide open position and, in accordance with his training, will have done so. He will then push button 8', causing relay 23' to reverse so that its armature 24' engages contact 26', setting up the holding circuit to coil 22' which holds relays armature 24' away from contact 27', leaving the circuit to blinker light 7' deenergized. Thereafter, when lighting conditions revert to night time conditions, relay 11 will again reverse, opening the circuit of contact 15' and deenergizing relay 23' so that the latter will automatically shift back to its position in engagement with contact 27', thus reestablishing the blinker circuit to light 7' for actuation whenever relay 11 again reverses upon a return to daylight conditions.

The mechanism is designed to be fool-proof, in that an erroneous or accidental act of the pilot in pushing a button 8 or 8' at a time when the corresponding relay 23 or 23' is in the "open" position engaging contact 26 or 26', no change in the condition of the circuit will occur.

In the event that the master switch 17 is opened, as in the case of termination of a flight, and again closed, as in the event of another flight, while the ambient light condition remains substantially unchanged, the system will resume its operation properly. For example, assuming that a daylight flight has just been completed, with the relay 11 shifted to contact 15′, energizing the circuit of lamp 7′, the interruption of current to conductor 20′ will cause relay 23′ to reverse, armature 24′ engaging contact 27′ to reset the circuit of light 7′ for resumed blinking as soon as master switch 17 is again closed. Thus, if a new pilot enters the plane and closes the master switch 17, he will receive the warning signal given by the blinking of lamp 7′ and will be thereby reminded to check the shutter of light 5 to determine whether it is in the proper position. He will then push button 8″ to arrest the blinking of light 7′. Thus the system provides the proper warning signal each time it is turned on, and requires an act of the pilot to turn off the blinking.

In the appended claims, the branch circuits composed of conductors 25, 25′, relays 23, 23′, conductors 28, 28′, blinker control switches 29, 29′ and conductors 32, 32′ are referred to as connecting circuits, and the branch circuits including push buttons 8, 8′, conductors 21, 21′ and relay actuator coils 22, 22′ are referred to as means for opening the connecting circuits. Relays 23, 23′ are referred to as connecting relays.

We claim:

1. In a warning system for signalling to an operator the necessity for adjusting an indicator for either maximum range or minimum range ambient light condition: a pair of electrically operable signal devices, one for indicating a low ambient light level and the other for indicating a high ambient light level; a source of electric power for energizing said devices; a pair of power leads for the respective devices; a single pole, double-throw sensitive relay having an armature arranged to receive current from said power source and a pair of contacts each connected to a respective one of said power leads, said armature being self-closing on one of said contacts; a photocell connected to said relay to energize the same to move said armature into engagement with the other contact when ambient light is within the maximum range, the output of said photocell being such that said armature will engage said one contact when ambient light is within the minimum range; a pair of connecting relays, each of a single-pole, double-throw type and each having a self closing position in which it completes a circuit through a respective power lead to a respective signal device, and each including electromagnetic means adapted, when energized, to shift the respective relay from said self closing position so as to open said circuit; and an energizing circuit for each of said connecting relays, each of said energizing circuits including a manually operable switch for energizing the respective relay to its circuit-opening position; each of said connecting relays including means for establishing a holding circuit for maintaining the energization of the respective relays so long as the respective power lead remains connected to said power source through said sensitive relay.

2. A warning system as defined in claim 1, including a master switch for opening all circuits whereby to release said holding circuits and cause said connecting relays to both revert to their self-closing positions so as to be set for operation of either of said connecting relays in accordance with ambient light conditions.

3. In a warning system for signalling to an operator the necessity for adjusting an indicator for either maximum range or minimum range ambient light condition: a pair of electrically operable signal devices, one for indicating a low ambient light level and the other for indicating a high ambient light level; a source of electric power for energizing said devices; a pair of power leads for the respective devices; relay means arranged to receive current from said power source and to establish alternate circuits from said power source to the respective power leads; photo-cell means for energizing said relay means to establish one of said alternate circuits when ambient light is within the maximum range, said relay means being arranged to automatically establish the alternate circuit when the output of said photo-cell means is reduced as the result of ambient light being within the minimum range; a pair of connecting relays, each of a single-pole, double-throw type and each having a self closing position in which it completes a circuit through a respective power lead to a respective signal device; and each including electromagnetic means adapted, when energized, to shift the respective relay from said self closing position so as to open said circuit; and an energizing circuit for each of said connecting relays, each of said energizing circuits including a manually operable switch for energizing the respective relay to its circuit-opening position; each of said connecting relays including means for establishing a holding circuit for maintaining the energization of the respective relay as long as the respective power lead remains connected to said power source through said relay means.

4. A warning system as defined in claim 3, including a master switch for opening all circuits whereby to release said holding circuits and cause said connecting relays to both revert to their self-closing positions so as to be set for operation of either of said connecting relays in accordance with ambient light conditions.

5. In a warning system for signalling to an operator the necessity for adjusting an indicator for either maximum range or minimum range ambient light conditions: a pair of electrically operable signal devices, one for indicating a low ambient light level and the other for indicating a high ambient light level; a source of electric power for energizing said devices; a pair of power leads for the respective devices; relay means arrange to receive current from said power source and to establish alternate circuits from said power source to the respective power leads; photocell means for energizing said relay means to establish one of said alternate circuits when ambient light is within the maximum range, said relay means being arranged to automatically establish the alternate circuit when the output of said photocell means is reduced as the result of ambient light being within the minimum range; a pair of connecting relays, each of a single pole, double throw type, each embodying a solenoid connected at one side to ground, each having an armature connected directly to a respective one of said power leads and each including a pair of contacts, one connected to the respective signal device, upon which said armature is self-closing, and another connected to the other side of said solenoid and positioned for engagement by said armature for establishing a holding circuit to maintain the energization of the respective relay so long as the respective power lead remains connected to the power source through said relay means; and a manually operable switch for each connecting relay, and conductor means connecting said manually operable switch to said other side of the solenoid in parallel with said armature, for initially energizing the respective relay to its circuit opening position in which said armature engages said other contact to establish said holding circuit.

6. In a warning system for signalling to an operator the necessity for adjusting an indicator for either maximum range or minimum range ambient light conditions: a pair of electrically operable signal devices, one for indicating a low ambient light level and the other for indicating a high ambient light level; a source of electric power for energizing said devices; a pair of power leads for the respective devices; relay means arranged to receive current from said power source and to establish alternate circuits from said power source to the respective power leads; photocell means for energizing said relay means to establish one of said alternate circuits when ambient light is within the maximum range, said relay means being arranged to automatically establish the alternate circuit when the output of said photocell means is reduced as the result of ambient light being within the minimum range; a pair of connecting relays, each having a self-closing position in which it completes a circuit through a respective power lead to a respective signal device, and each arranged, when energized, to shift to an open position so as to open said circuit; and parallel energizing circuits for each of said connecting relays, said parallel circuits each including a manually operable switch for initially energizing a respective connecting relay and means actuated by the respective relay for establishing a holding circuit when the respective connecting relay is thus initially energized, for maintaining the energization of the respective connecting relay so long as the respective power lead remains connected to said power source through said relay means.

7. In a warning system for signalling to an operator the necessity for adjusting an indicator for either maximum range or minimum range ambient condition: electrically operable signal means alternatively actuatable to indicate either low or high ambient light level; a source of electric power for energizing said signal means; a pair of power leads for supplying to said signal means current for the high and the low level actuation thereof respectively; relay means arranged to alternatively connect said power source to one or the other of said power leads; photocell means for energizing said relay means to establish the connection of said power source to one of said power leads when ambient light is within the maximum range, said relay means being arranged to automatically establish the alternate connection when the output of said photocell is reduced as the result of ambient light being within the minimum range; a pair of connecting relays, each having a self-closing position in which it completes a circuit through a respective power lead to said signal means for effecting a respective one of the alternate actuations thereof and each arranged, when energized, to shift to an open position so as to open said circuit; and parallel energizing circuits for each of said connecting relays, said parallel circuits each including a manually operable switch for initially energizing a respective connecting relay and means actuated by the respective relay for establishing a holding circuit when the respective connecting relay is thus initially energized, for maintaining the energization of the respective connecting relay so long as the respective power lead remains connected to said power source through said relay means.

REX E. LOVEJOY.
KENNETH A. SMITH.
FRANK A. HARRINGTON.
JERRY K. HARTER.

References Cited in the file of this patent

UNITED STATES PATENTS

| Number | Name | Date |
|---|---|---|
| 2,302,271 | Smith | Nov. 17, 1942 |
| 2,375,677 | Moore | May 8, 1945 |
| 2,489,076 | Bjontegard | Nov. 22, 1949 |
| 2,490,639 | Lamb | Dec. 6, 1949 |
| 2,602,111 | Baker | July 1, 1952 |